US006917877B2

(12) United States Patent
Yang (10) Patent No.: US 6,917,877 B2
(45) Date of Patent: Jul. 12, 2005

(54) METHOD FOR DETERMINING THE INTERSECTION OF POLYGONS USED TO REPRESENT GEOGRAPHIC FEATURES

(75) Inventor: Xiangheng Yang, Glenview, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 09/929,397

(22) Filed: Aug. 14, 2001

(65) Prior Publication Data

US 2003/0037059 A1 Feb. 20, 2003

(51) Int. Cl.[7] .................................................. G06F 3/14
(52) U.S. Cl. ...................................................... 701/208
(58) Field of Search ................................. 701/200, 208, 701/225, 300; 342/452, 457; 340/988, 990, 995; 345/620–621, 624–627, 629–630, 634, 641

(56) References Cited

U.S. PATENT DOCUMENTS

| | | | |
|---|---|---|---|
| 4,694,404 A | | 9/1987 | Meagher |
| 5,179,645 A | * | 1/1993 | Tanimori .................... 345/441 |
| 5,347,619 A | | 9/1994 | Erb ............................ 395/126 |
| 5,583,975 A | | 12/1996 | Naka et al. |
| 5,613,052 A | | 3/1997 | Narayanaswami |
| 5,694,534 A | | 12/1997 | White, Jr. et al. |
| 5,739,826 A | | 4/1998 | Shiraishi et al. |
| 5,818,460 A | | 10/1998 | Covey et al. ............... 345/443 |
| 5,832,127 A | | 11/1998 | Healy |
| 5,961,572 A | * | 10/1999 | Craport et al. ............. 340/990 |
| 5,990,896 A | | 11/1999 | Barrus |
| 6,208,352 B1 | | 3/2001 | Blackwell |
| 6,215,503 B1 | | 4/2001 | Snyder et al. |
| 6,330,858 B1 | | 12/2001 | McDonough et al. ....... 101/208 |
| 6,424,911 B2 | * | 7/2002 | Yamashita et al. .......... 340/988 |
| 6,622,085 B1 | | 9/2003 | Amita et al. ................ 701/208 |

FOREIGN PATENT DOCUMENTS

| | | | |
|---|---|---|---|
| EP | 0784296 A1 | 7/1997 | ........... G06T/17/50 |
| WO | WO00/43953 | 7/2000 | ............. G06T/1/00 |

OTHER PUBLICATIONS

O'Rourke, Joseph, *Computational Geometry In C*, Second Edition, Cambridge University Press, pp. 252–269 (1998).
Weiler, Kevin, "Polygon Comparison Using a Graph Representation", Institute of Building Sciences, Carnegie–Mellon University, Pittsburgh, PA 15213 (1980); ACM 0–89791–021–4/80/0700–0010, pp. 10–18.

(Continued)

*Primary Examiner*—Thu V. Nguyen
(74) *Attorney, Agent, or Firm*—Frank J. Kozak; Jon D. Shutter; Lawrence M. Kaplan (57) ABSTRACT

A method for determining a polygonal intersection of a first polygon and a second polygon. An intersection of the boundary of the first polygon with the boundary of the second polygon is located by finding a point from which at least three portions of boundaries extend. From this point, a first portion of the boundary of the polygonal intersection is determined by identifying a portion of the boundary of the first polygon that is located inside the second polygon. Each subsequent portion of the boundary of the polygonal intersection is determined by selecting that portion of the boundary of either the first polygon or the second polygon that (1) connects to a leading end of a current portion of the boundary of the polygonal intersection and (2) forms the least angle with the current portion of the boundary of the polygonal intersection.

20 Claims, 12 Drawing Sheets

OTHER PUBLICATIONS

Greiner, Gunther, Hormann, Kai, "Efficient Clipping of Arbitrary Polygons", Friedrich Alexander University (Apr. 1998); ACM Transactions on Graphics, vol. 17, No. 2, pp. 71–83.

Lewis, Rick ; Sequin, Carlo, "Generation of 3D building models from 2D architectural plans" *Computer Aided Design*, Elsevier Publishers BV., Barking, GB, vol. 30, No. 10, pp. 765–779 (Sep. 1998).

Zalik, B, "A topology construction from line drawings using a uniform plane subdivision technique", *Computer Aided Design*, Elsevier Publishers BV., Barking, GB, vol. 31, No. 5, pp. 335–348 (Apr. 1999).

Yang, Y. et al., "An efficient scanning pattern for layered manufacturing processes", Proceedings of the 2001 IEEE International Conference on Robotics and Automation, ICRA 2001, Seoul, Korea May 21–26, 2001, pp. 1340–1345.

EP 02255634 Search Report, dated Oct. 27, 2004.

* cited by examiner

(Test if a point on, on left,
or on right side of a line segment)

To test position of P3 relative to line segment P1P2, let $c = (x1 - x3)*(y2 - y3) - (x2 - x3) * (y1-y3)$ If c = 0, P3 is on line segment P1P2;
If c > 0, P3 is on right side of line segment P1P2;
If c < 0, P3 is on left side of line segment P1P2;

FIG. 10

METHOD FOR DETERMINING THE INTERSECTION OF POLYGONS USED TO REPRESENT GEOGRAPHIC FEATURES

BACKGROUND OF THE INVENTION

The present invention relates to a method of determining the intersection of two polygons, particularly with respect to determining the intersection of two polygons that represent geographic features.

In geographic databases, polygons are used to represent two-dimensional areas, such as lakes, recreational parks, cities, counties, states, golf courses, and so on. A commonly needed function performed using a geographic database is to find that part of one two-dimensional geographic feature (such as a lake, a recreational park, etc.) which is located inside another two-dimensional geographic feature (such as a city, county, state, and so on). The solution can be found by determining the intersection of the polygons used to represent the two-dimensional geographic features.

There are prior methods for determining the intersection of polygons. One well known algorithm for determining the intersection of polygons is described in *Computational Geometry* (O'Rourke, Joseph. Second Edition. Cambridge University Press, 1998). This algorithm takes all shape points from two polygons, sorts them by their y coordinate value and sweep searches the line segments at each shape point from top to bottom. If a line segment is located in both polygons, then it is an intersection boundary. With this prior algorithm, if there are n shape points in two polygons, the overall complexity is n*log(n). Thus, although this prior algorithm works satisfactorily, it is computationally intensive and accordingly takes a relatively large amount of time to obtain a result.

Therefore, there is a need for faster way to determine the intersection of two polygons.

SUMMARY OF THE INVENTION

To address these and other objectives, the present invention comprises a method for determining a polygonal intersection of a first polygon and a second polygon. An intersection of the boundary of the first polygon with the boundary of the second polygon is located by finding a node from which at least three portions (i.e., links) of polygon boundaries extend. From this node, a first portion of the boundary of the polygonal intersection is determined by identifying a portion of the boundary of the first polygon that is located inside the second polygon. Each subsequent portion of the boundary of the polygonal intersection is determined by selecting that portion of the boundary of either the first polygon or the second polygon that (1) connects to a leading end of a current portion of the boundary of the polygonal intersection and (2) forms the least angle with the current portion of the boundary of the polygonal intersection.

According to a further aspect of the disclosed invention, intersected holes or islands are determined if they are in both polygons.

DETAILED DESCRIPTION OF THE PRESENTLY PREFERRED EMBODIMENTS

I. The Geographic Database

Figure 1:
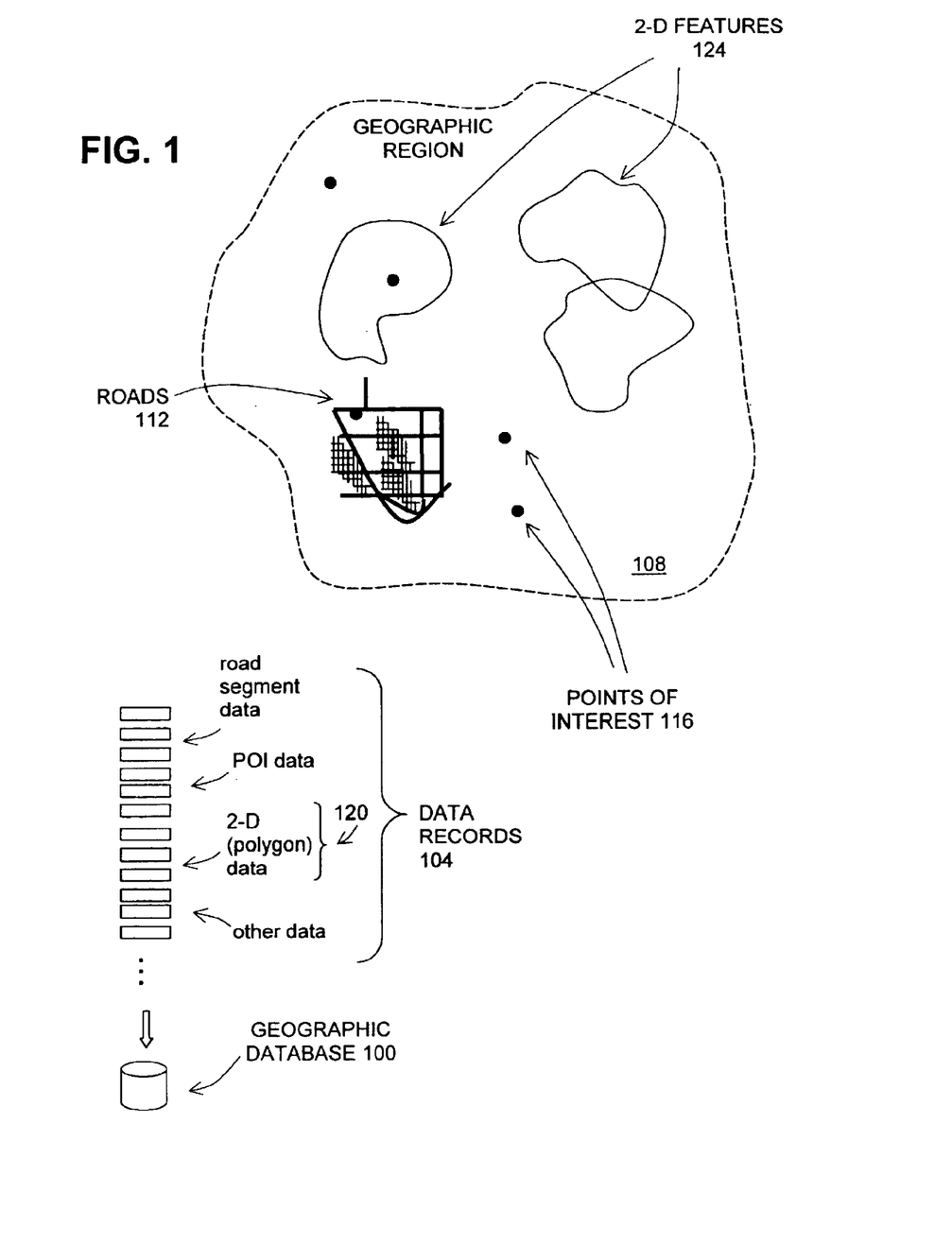
FIG. 1 is a diagram that illustrates a geographic region and data representations of some of the features located in the geographic region.

Referring to FIG. 1, a geographic database 100 includes data that represent features that are located in a covered region 108. For example, the geographic database 100 may contain data that represent roads 112 and points of interest 116. The geographic database 100 also includes data 120 that represent two dimensional features or entities 124. Some of the different kinds of two dimensional features that can be represented in the geographic database 100 include land features (e.g., mountain ranges), bodies of water (e.g., lakes, ponds, swamps, wetlands), recreation areas (e.g., golf courses, parks, stadiums, forest preserves), business parks, industrial parks, and governmental administrative areas (e.g., cities, towns, states, townships, municipalities, counties, school districts), as well as other types of areas.

Figure 2:
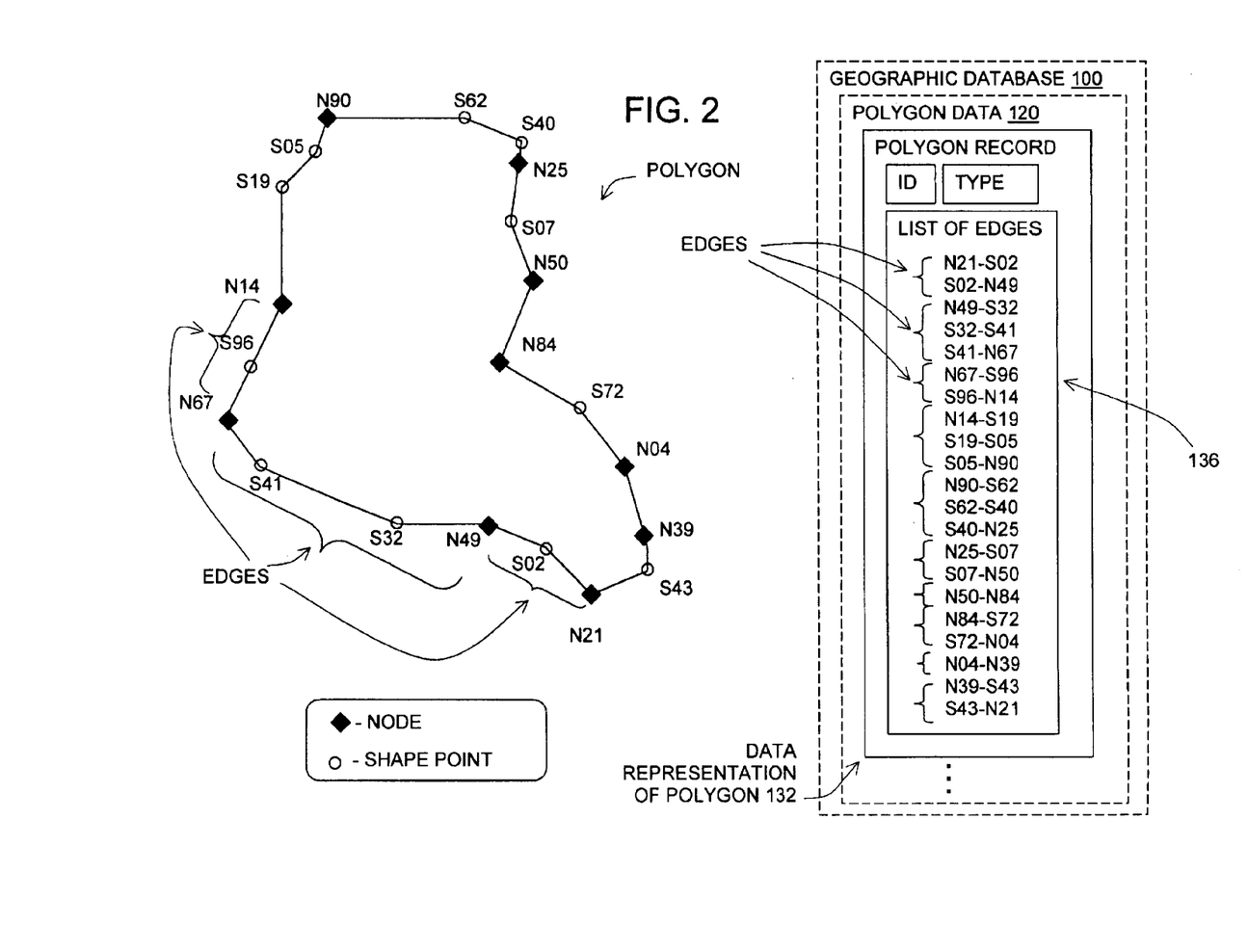
FIG. 2 is a diagram that illustrates a polygon used to represent a two-dimensional geographic area and a data representation of the polygon.

Referring to FIG. 2, in the geographic database 100, two-dimensional features are represented using polygons. In other words, in the geographic database 100, the data that are used to represent two-dimensional features describe these features as polygons. In the geographic database 100, the boundary of the polygon corresponds to the boundary of the represented two-dimensional feature.

The following terminology applies to the representation of two-dimensional features in the geographic database 100.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes.

"Oriented Link"—A link that has a starting node (referred to as the "reference node") and an ending node (referred to as the "non reference node").

"Simple Polygon"—An interior area of an outer boundary formed by a string of oriented links that begins and ends in one node. (A simple polygon does not cross itself.)

"Polygon"—The area bounded by an outer boundary and none or at least one interior boundary (e.g., a hole or island). A polygon is constructed from one outer simple polygon and none or at least one inner simple polygon. A polygon is simple if it just consists of one simple polygon, or complex if it has at least one inner simple polygon.

The geographic database 100 follows certain conventions. For example, links do not cross themselves and not cross each other except at a node. Also, there are no duplicated shape points, nodes or links. Two links that connect to each other have a common node. In the geographic database 100, overlapping two-dimensional geographic features are represented by overlapping polygons. When polygons overlap, the boundary of one polygon crosses the boundary of the other polygon. In the geographic database 100, the location at which the boundary of one polygon intersects the boundary of another polygon is represented by a node. (A node may be used to represent other locations along the boundary of a polygon other than a location at which the boundary of the polygon intersects the boundary of another polygon.) A shape point is not used to represent a point at which the boundary of a polygon intersects the boundary of another polygon.

In the geographic database 100, a data representation 132 of a polygon that represents a two-dimensional feature includes a list 136 that identifies each oriented link that forms the boundary of the polygon. According to a convention used in the geographic database, the list 136 identifies the oriented links in clockwise order. If the polygon has a hole (i.e., a second polygon located entirely inside the first polygon), the hole is identified by a list of oriented links listed in counter clockwise order.

II. Method for Determining the Intersection of Polygons

As mentioned above, with applications that use geographic databases, there is sometimes a need to determine whether two two-dimensional features overlap and, if they do, to determine the two-dimensional area that forms the intersection (i.e., the overlapping portion) of the two two-dimensional areas. In terms of the polygons used to represent these two-dimensional features, there is a need to determine the intersection of polygons.

Figure 3:
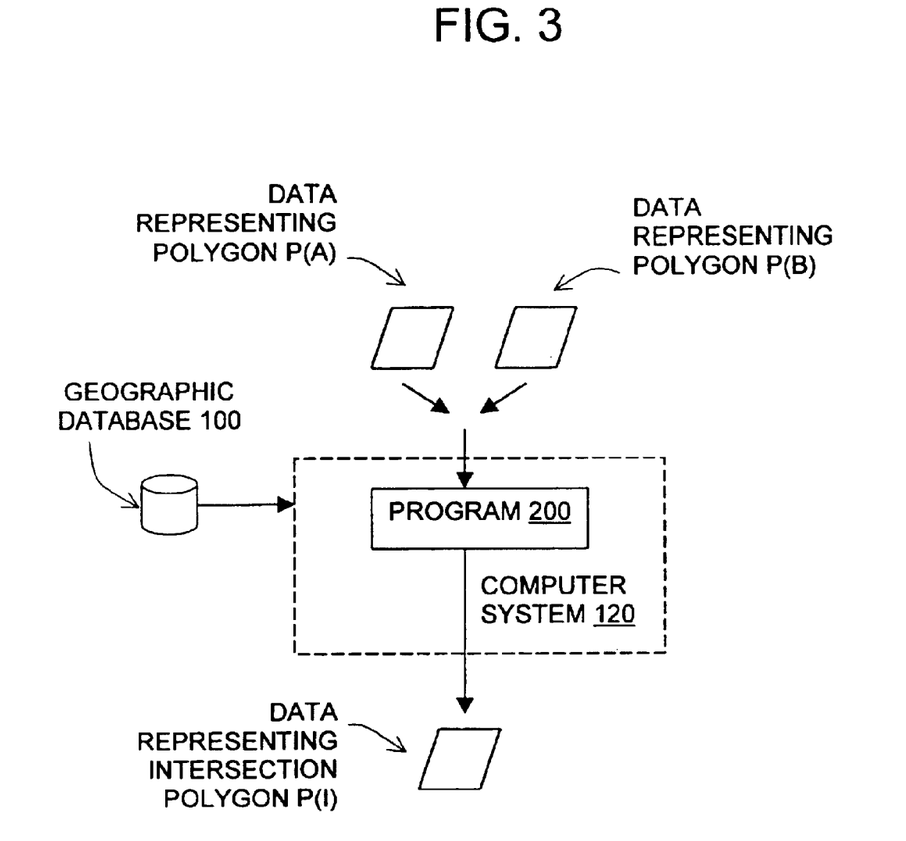
FIG. 3 is a block diagram illustrating a software program that determines the intersection of two polygons.

A method for determining the intersection of polygons is described in connection with FIGS. 3–10. Referring to FIG. 3, the method is implemented by a software program 200 that uses the geographic database 100 that contains data representations of polygons, as described in connection with FIGS. 1 and 2. The software program 200 receives two data representations of polygons as an input. (The two data representations of polygons conform to those described in FIG. 2.) The software program 200 provides, as an output, a data representation of each polygon that represents a polygonal intersection of the two data representations of polygons that were provided as input. Alternatively, the software program 200 provides an output indicating that there is no intersection of the two data representations of polygons that were provided as input.

The software program 200 may be installed on a navigation system that uses a geographic database to provide navigation-related features to a driver of a vehicle. The software program 200 may also be installed on a server that uses a geographic database to provide navigation-related services to various types of users, including vehicle drivers, persons who are not drivers, users of personal digital assistants (PDAs), cell phone users, and so on. The server that uses the geographic database may be connected to the Internet or other communications network. The software program 200 may also be used when compiling a geographic database, i.e., to produce a derived database product from a source database. The software program 200 may also be used on a standalone computer that uses a geographic database to provide various navigation-related, map-related, or other types of features.

In any of these different systems, the software program 200 may be stored on a computer-readable medium, loaded from the medium into a memory of the system and run, as needed.

Figure 4:
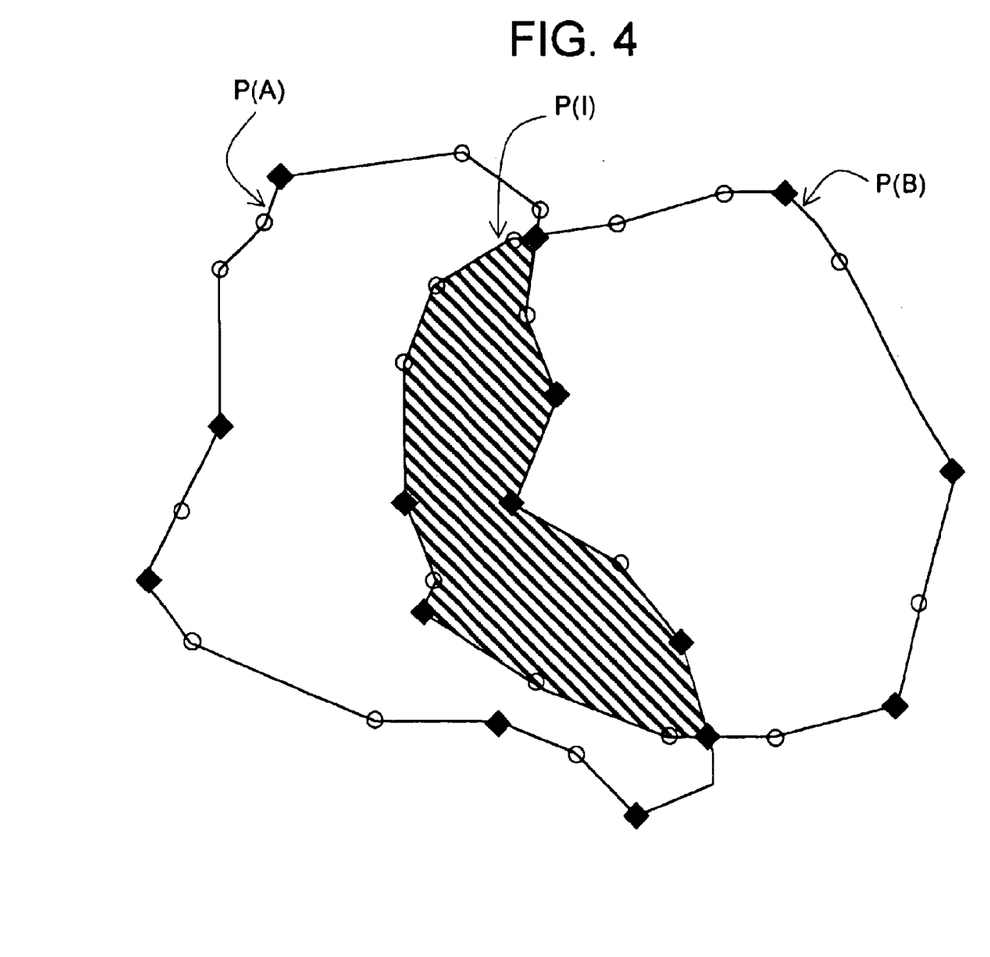
FIG. 4 depicts two intersecting polygons and illustrates operation of a process performed by the software program of FIG. 3.

The determination of the polygonal intersection of two polygons is described with reference to FIGS. 4–10. FIG. 4 shows two polygons, labeled P(A) and P(B). Using the disclosed embodiment, the intersection, P(I), of polygons P(A) and P(B) is determined.

Figure 5A:
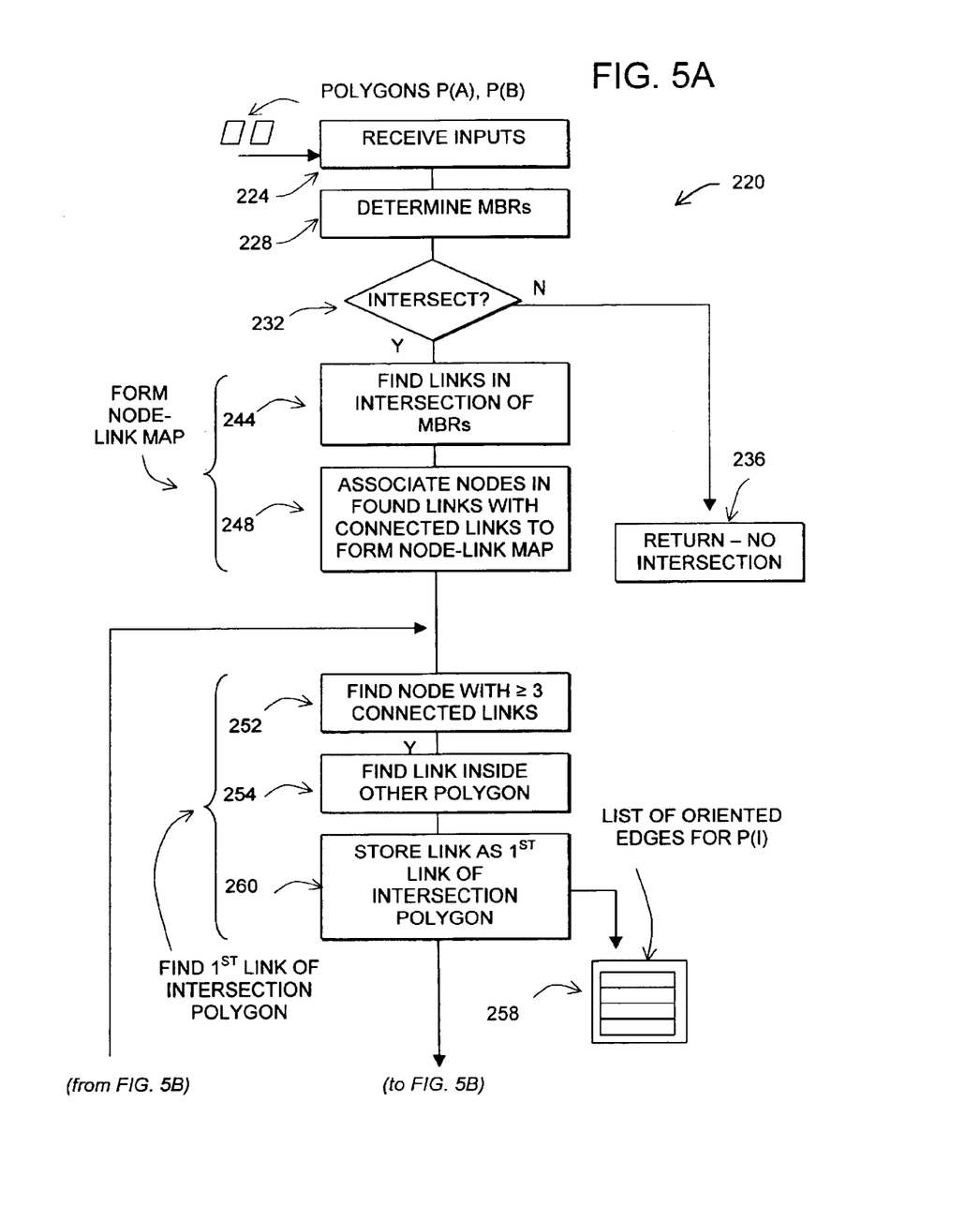
FIGS. 5A–5C are a flow chart of the process performed by the software program of FIG. 3.
Figure 5B:
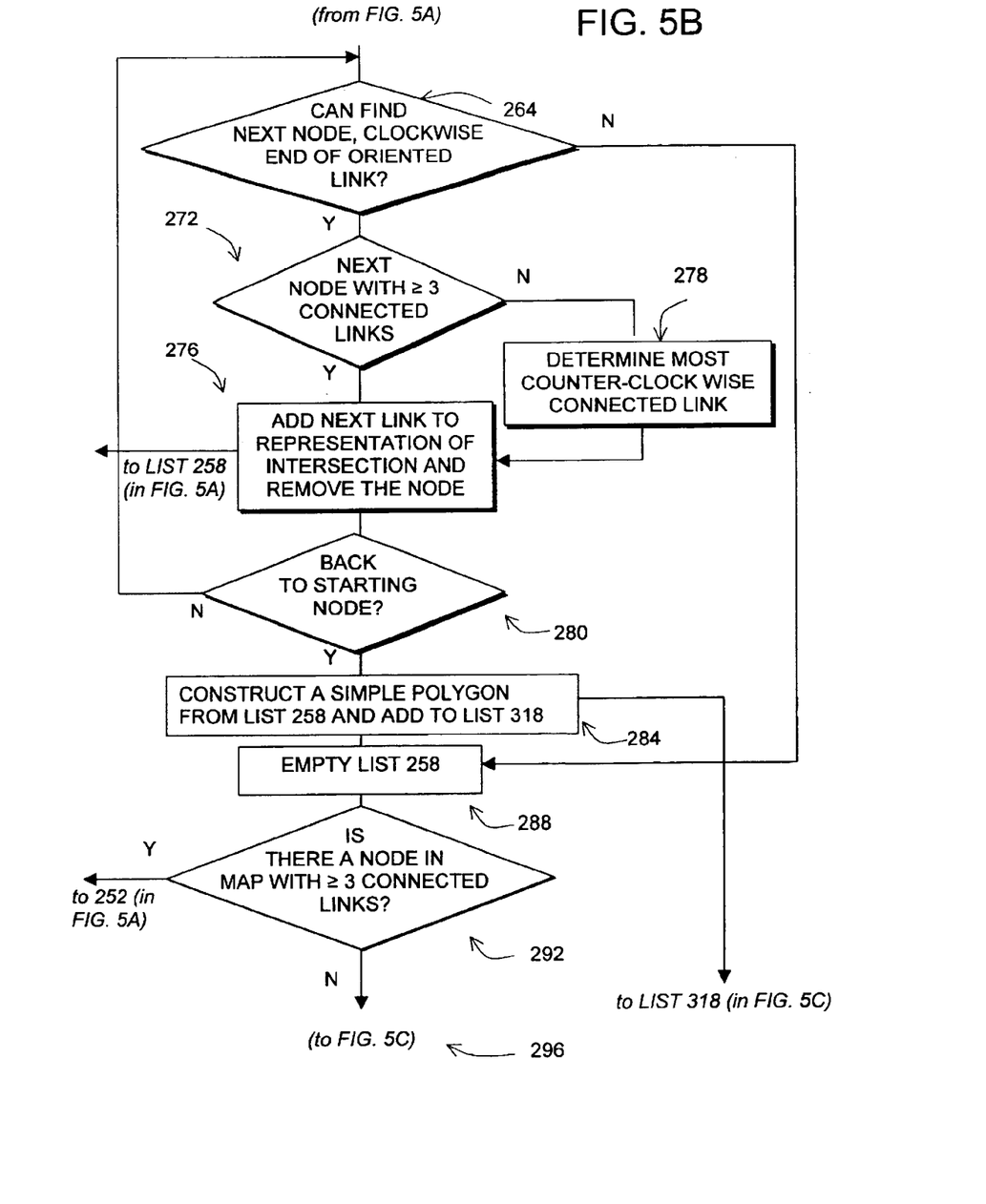
Figure 5C:
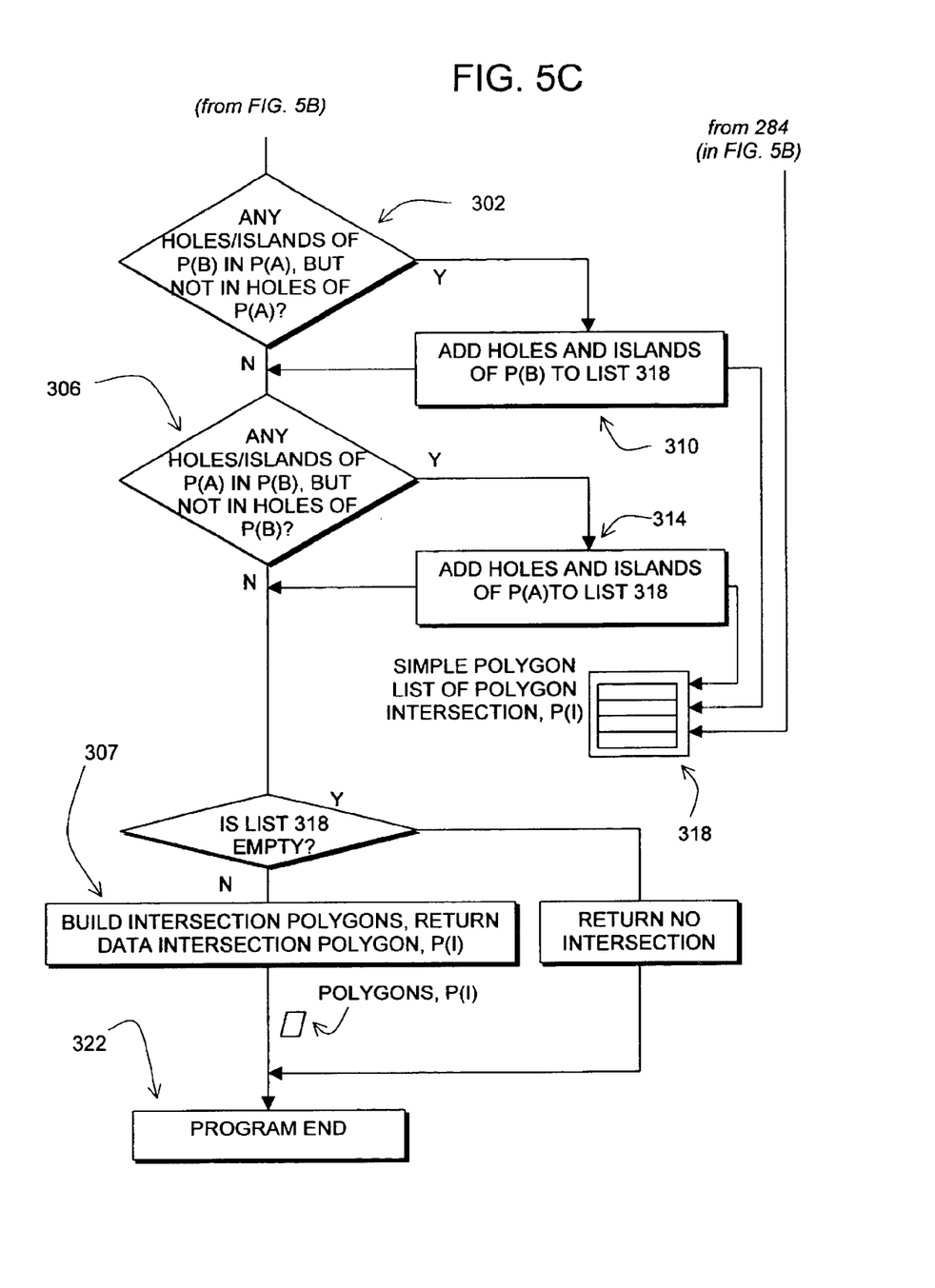
Figure 6:
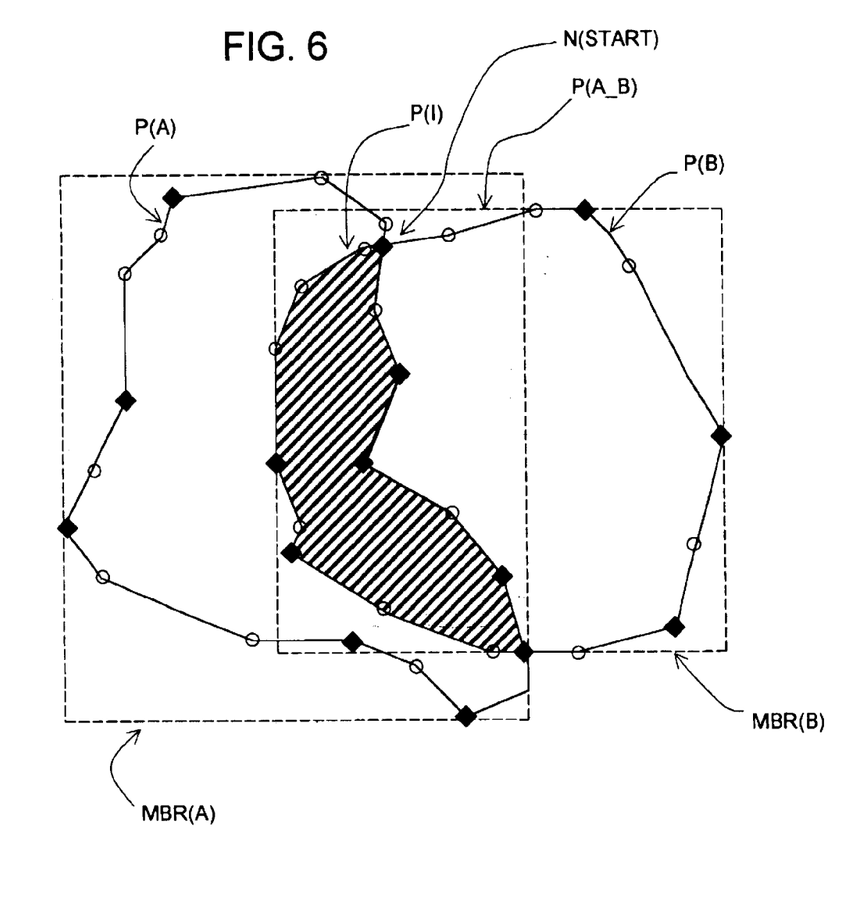
FIG. 6 depicts a step in the process of FIGS. 5A–5C.

FIGS. 5A–5C shows steps in a process 220 performed by the software program 200 for determining the intersections of the polygons P(A) and P(B). The process 220 begins with a step in which the data representations of the two polygons are received (Step 224). The process 220 includes a step that forms minimum bounding rectangles for the two polygons P(A) and P(B) (Step 228). FIG. 6 depicts formation of these minimum bounding rectangles for P(A) and P(B), labeled MBR(A) and MBR(B), respectively. The minimum bounding rectangles, MBR(A) and MBR(B), are compared to determine whether they intersect (Step 232). If the minimum bounding rectangles of P(A) and P(B) do not intersect, then the polygons P(A) and P(B) do not intersect, and a negative result is returned (Step 236). If the minimum bounding rectangles MBR(A) and MBR(B) intersect, then the polygons P(A) and P(B) may intersect and the process 220 continues.

The process continues by forming a node-link map. The node-link map is formed using the polygonal intersection, MBR(A_B) of the minimum bounding rectangles MBR(A) and MBR(B) of the polygons P(A) and P(B). This polygonal intersection P(A_B) is determined as shown in FIG. 6. To form the node-link map, each link of either polygon, P(A) or P(B), which is located entirely inside the polygonal intersection P(A_B) of the minimum bounding rectangles MBR(A) and MBR(B) of the polygons P(A) and P(B) is identified (Step 244). (A link is located entirely inside the intersection MBR(A_B) of the minimum bounding rectangles MBR(A) and MBR(B) if both ends of the link are inside the intersection MBR(AB) of the minimum bounding rectangles MBR(A) and MBR(B).) Then, each node of each of these identified links is identified. (Shape points can be ignored at this step.) Each of these identified nodes is then included as an entry in the node-link map (Step 248). For each node included as an entry in the node-link map, all the links that connect to the node are identified and associated with the node in the map.

The node-link map is used to identify a node (referred to herein as "N(START)") that is located on the polygon P(I) that forms the intersection of the input polygons P(A) and P(B). Using the node-link map, a node is identified that has three (or more) links associated with it (Step 252). A node from the node-link map that has three (or more) links associated with it is located on the polygon P(I) that forms the intersection of the two polygons P(A) and P(B). Because this node is located on the polygon P(I) that forms the intersection of the two polygons P(A) and P(B), two (and only two) of the three or more links that connect to the node N(START) are links of the intersection polygon P(I). The next step is to identify which two of the three of more links form part of the intersection polygon P(I).

In order to identify which of the links that connect to N(START) form part of the intersection polygon P(I), a process is performed that identifies one link of one of the original polygons, P(A) or P(B), that is located inside the other of the original polygons, P(B) or P(A) (Step 254). A link of one of the original polygons that is located inside the other of the original polygons is part of the intersection polygon P(I). This link is referred to as "LINK(START)." Details of the process for finding this link are illustrated in FIGS. 7A, 7B and 8.

Figure 7A:
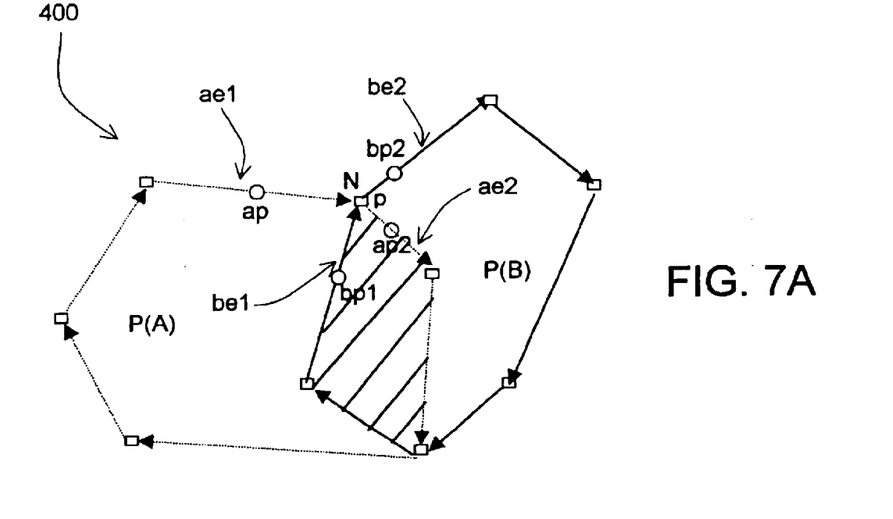
FIGS. 7A and 7B depict another step in the process of FIGS. 5A–5C.
Figure 7B:
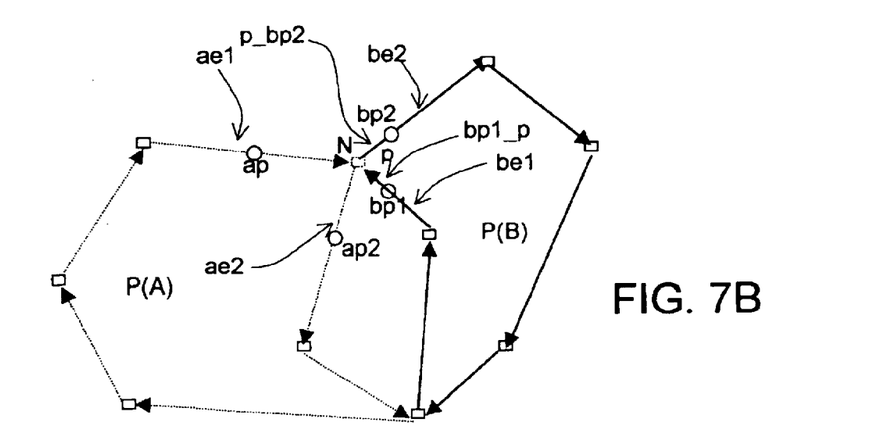
Figure 8:
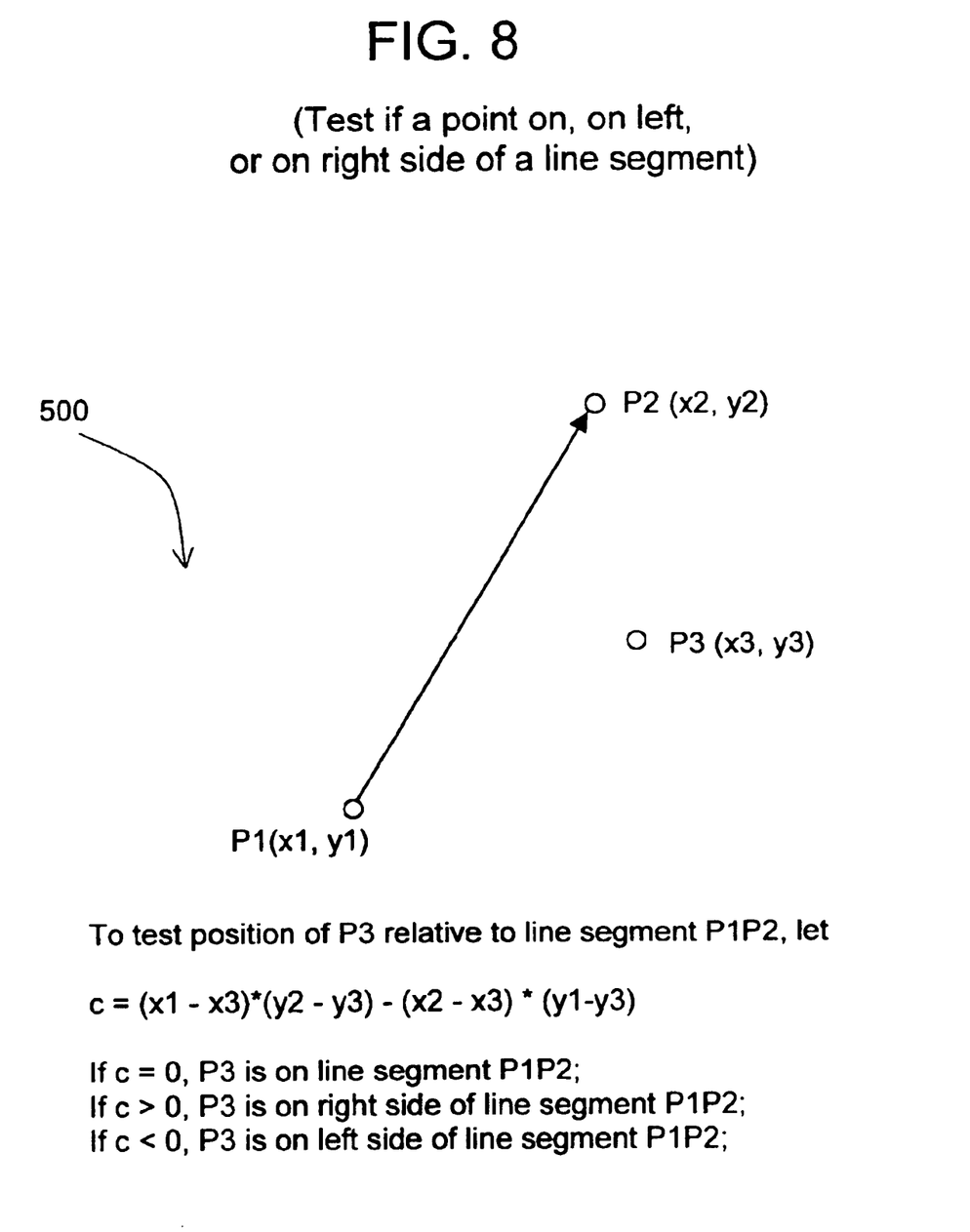
FIG. 8 depicts another step in the process of FIGS. 5A–5C.

Referring to FIGS. 7A and 7B, in P(A) and P(B), all edges are oriented clockwise. Node N is the starting node since four edges are connected to it, i.e., ae1 and ae2 from P(A), be1 and be2 from P(B). If ae2 is on the right side of be1 and be2, then ae2 is inside P(B) and can be selected as the starting edge of the polygon intersection (as shown in FIG. 7A). If ae1 is on the right side of be1 and be2, then ae1 is inside P(B) and can be selected as the starting edge of the polygon intersection. If ae2 and ae1 both are not on the right side of be1 and be2, there is no intersection at N (as shown in FIG. 7B). To determine whether ae2 is on the right side of be1 and be2, the process 500 shown in FIG. 8 can be used. Using the process 500 in FIG. 8, the shape point bp1 is selected from be1, the shape point bp2 is selected from be2 and the shape point ap2 is selected from ae2. These shape points are selected because they are the closest shape points on their respective edges to node N (i.e., point p) although other shape points on these edges may be selected as well. The process 500 in FIG. 8 is used to test if point ap2 is on the right side of the line segment bp1_p and p_bp2. According to the process 500, to test the position of a point, P3, relative to a line segment P1P2, calculate $c=(x1-x3)*(y2-y3)-(x2-x3)*(y1-y3)$. If c=0, P3 is on the line segment P1P2. If c>0, P3 is on right side of the line segment P1P2. If c<0, P3 is on left side of the line segment P1P2. If ap2 is on the right side of the line segment bp1_p and p_bp2, ae2 is to the right of be1 and be2 (as shown in FIG. 7A). If not, ae2 is not on the right of be1 and be2 (as shown in FIG. 7B).

After LINK(START) is identified, the next link that forms the intersection polygon P(I) is identified. This next link is identified by examining all the links that connect to the clockwise end of the LINK(START). Referring to FIG. 5B, the clockwise end of the LINK(START) is determined from the clockwise direction of the links in the original polygon (P(A) or P(B)) from which LINK(START) was taken (Step 264).

If there is only one other link that connects to the clockwise end of the link, LINK(START), then this link is the next link of the intersection polygon P(I). Data indicating this next link are stored in the list formed to represent the intersection polygon P(I) (Steps 272 and 276).

If there are two or more other links that connect to the clockwise end of the LINK(START), then the link that forms the smallest angle in the counterclockwise direction from LINK(START) is the next link of the intersection polygon P(I). Data indicating this next link are stored in the list formed to represent the intersection polygon P(I) (Steps 272, 278 and 276).

After this link (i.e., the link after LINK(START)) is added to the list formed to represent the intersection polygon P(I), the process continues by determining the next link that forms the intersection polygon P(I). This next link is determined in a similar manner as just described. That is, all the links that connect to the clockwise end of the link are identified (Steps 264 and 272, again). If there is only one other link, then this link is added to the list of links that form the intersection polygon P(I). If there are two or more other links, then the next link is the one that forms the smallest angle in a counterclockwise direction from the link most recently identified as being part of the intersection polygon P(I) (Step 278, again).

The process continues until the N(START) is encountered (Step 280). When N(START) is encountered, then one simple polygon (that forms part or all of the entire polygon intersection P(I) of P(A) and P(B)) has been identified. Data describing this simple polygon are contained in the list 258. These data are added to a simple polygon list in a data representation 318 (in FIG. 5C) of the entire intersection polygon P(I) of P(A) and P(B) (Step 284).

All used links and nodes in the link-node map are removed (Step 288). If there are still nodes with three or more connected links in the node-link map after a simple polygonal intersection has been identified (Step 292 in FIG. 5B), then there is at least one more distinct simple polygonal intersection between the first polygon and the second polygon. The process is repeated (starting at Step 252 in FIG. 5A) to determine each additional simple polygonal intersection. The process is repeated until there is no node in the link-node map that has more than three links connected to it.

The process 220 finds intersected holes and islands in P(A) and P(B). Some two-dimensional features represented in the geographic database 100 are encompassed entirely within other represented two-dimensional features. As an example, an island is located entirely within a body of water. In the geographic database 100, a two-dimensional feature that is encompassed entirely within another two-dimensional is represented as a hole inside a polygon.

Figure 9:
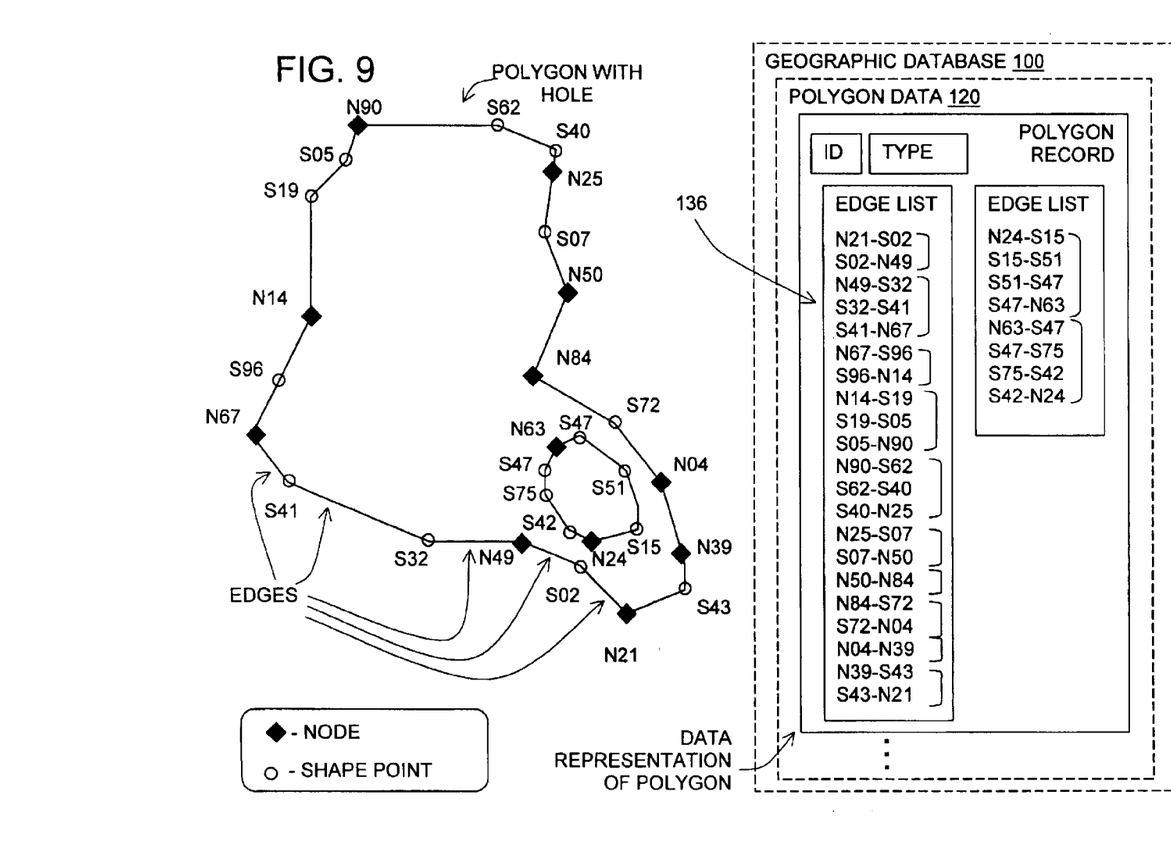
FIG. 9 shows a polygon with a hole and data representation thereof

The data representation of the polygon containing a hole includes (1) a list of edges that define the boundary of the entire polygon (i.e., similar to FIG. 2, described above) and (2) a list of edges that define the boundary of the hole located inside the polygon. According to a convention used in the geographic database 100, the list of edges in the data representation of a hole inside a polygon are ordered in counter-clockwise order. FIG. 9 shows a polygon with a hole and data representation thereof.

Figure 10:
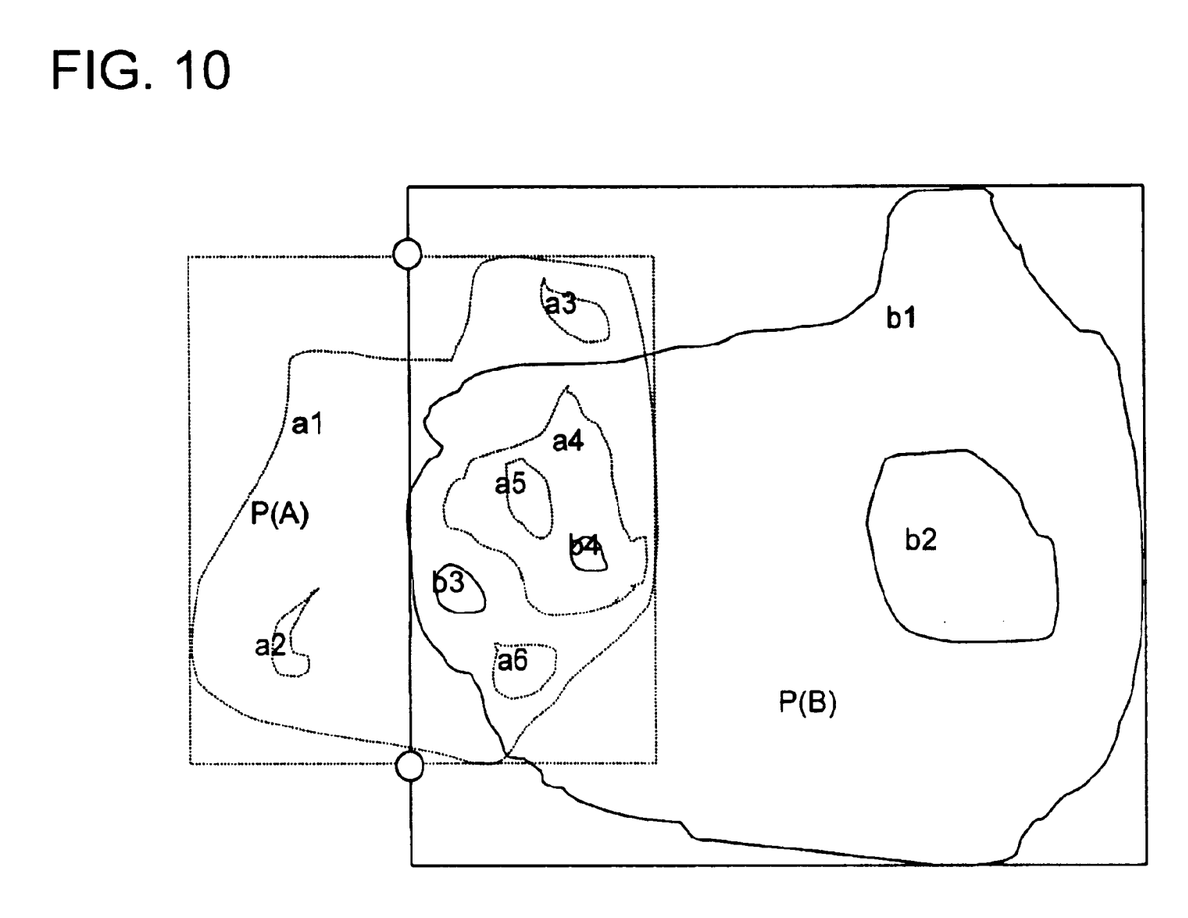
FIG. 10 shows an intersection of polygons with holes in the intersection.

When determining the intersection of two polygons that have holes, it is possible that some of the holes are included in the intersection. FIG. 10 illustrates the intersection of two polygons having holes/islands in their intersection.

When the disclosed process 220 is used to determine the polygonal intersection of two polygons, the data representation of the polygonal intersection includes a representation of any holes of either of the original polygons that are located inside the polygonal intersection. First, a determination is made whether the minimum bounding rectangle of the hole is located inside the intersection of the minimum bounding rectangles of the two original polygons. If the minimum bounding rectangle of the hole is not located completely inside the intersection of the minimum bounding rectangles of the two original polygons, then the hole is not located in the polygonal intersection. If the minimum bounding rectangle of the hole is located inside the intersection of the minimum bounding rectangles of the two original polygons, then a determination is made whether any point (e.g., any node) of the hole is located inside the other of the polygons.

FIG. 5C shows steps in the process 220 for handling holes/islands in the intersection polygon, P(I). Starting with an island/hole from polygon A, a search is made to find an immediate parent simple polygon in polygon B. If there is a simple polygon in B and its orientation is clockwise, then the island/hole from polygon A is a simple intersection polygon. If there is no parent polygon in B or the orientation of the parent simple polygon in B is counter clockwise, then the island/hole from polygon A is not a simple intersection polygon (Step 302). These steps are repeated until all islands/holes from polygon A have been considered.

The process continues by considering an island/hole from polygon B and searching for an immediate parent simple polygon in polygon A. If there is a simple polygon in A and its orientation is clockwise, then the island/hole from polygon B is a simple intersection polygon. If there is no parent polygon in A or the orientation of the parent simple polygon in A is counter clockwise, then the island/hole from polygon B is not a simple intersection polygon (Step 306). This process is repeated until all islands/holes from polygon B have been visited.

After accounting for any holes or islands in the intersection, a data representation of the entire complex polygon intersection, P(I), is built from the list(s) of simple polygons list 318 (Step 307). The intersection of P(A) and P(B) may include one or more polygons, each of which may be either simple or complex. The data representation of the polygonal intersection can then used by other applications in the system in which the software program 200 is installed that require data indicating the polygonal intersection of the P(A) and P(B) (Step 288)

III. Advantages

The present method for determining the intersection of polygons is computationally less intensive than prior methods. The present method achieves this advantage, in part, because only the polygon edge is considered instead of entire line segments, therefore greatly reducing the amount of computation.

IV. Further Considerations

Consistent Ordering—Clockwise or Counterclockwise

In the embodiments described above, it was explained that the data representations of polygons included lists of links used to represent the boundaries of the polygons and that the links contained on a list were ordered corresponding to a clockwise traversal of the represented polygon boundary via the links. It is not required that the lists of links used to represent polygons identify the links in clockwise order so long as the order in which the links are listed is consistent throughout the geographic database. For example, according to an alternative embodiment, instead of listing the links that form polygon boundaries in a clockwise order, data representations of polygons could list the links in a counterclockwise order. If a counterclockwise order is used for polygon boundaries, it might be preferable to use a clockwise order to represent holes in polygons.

It is intended that the foregoing detailed description be regarded as illustrative rather than limiting and that it is understood that the following claims including all equivalents are intended to define the scope of the invention.

I claim:

1. A method for determining a polygonal intersection of a first polygon and a second polygon represented by data contained in a geographic database, wherein the first polygon has a boundary comprised of a series of links ordered in a known rotational direction and the second polygon has a boundary comprised of a series of links ordered in the known rotational direction, the method comprising:

at an intersection of the boundary of the first polygon with the boundary of the second polygon, determining a first known portion of a boundary of the polygonal intersection as comprised of a portion of the boundary of the first polygon that is located inside the second polygon, wherein the portion of the boundary of the second polygon that is located inside the second polygon is comprised of one or more links; and where a leading end of the current known portion of the boundary of the polygonal intersection connects to two other links, determining a subsequent portion of the boundary of the polygonal intersection by selecting that portion of the boundary of either the first polygon or the second polygon that connects to the leading end of the current known portion of the boundary of the polygonal intersection and that forms a minimum rotation angle in the rotational direction with the current known portion of the boundary of the polygonal intersection if the direction of traversal of the current known portion of the boundary of the polygonal intersection is opposite the known rotational direction or that forms a minimum rotation angle in the opposite rotational direction with the current known portion of the boundary of the polygonal intersection if the direction of traversal of the current known portion of the boundary of the polygonal intersection is the same as the known rotational direction.

2. The method of claim 1 wherein the first polygon, the second polygon and the polygonal intersection are represented by data indicating a list of links.

3. The method of claim 2 wherein the links represent the boundaries of the polygons.

4. The method of claim 2 wherein the links in the list of links are consistently ordered in either a clockwise or counterclockwise direction.

5. The method of claim 2 wherein a hole located in the first polygon is represented by data indicating a list of links.

6. The method of claim 5 wherein the links in the list of links that represent a hole are ordered in an opposite direction to the direction used to order the links in the list of links used to represent the first polygon.

7. The method of claim 2 wherein the links in the list of links are consistently ordered in a clockwise direction.

8. The method of claim 1 wherein the first polygon and the second polygon represent two-dimensional geographic features.

9. The method of claim 1 wherein the steps of determining are performed by a software program that uses a geographic database containing data representations of the first polygon and the second polygon.

10. The method of claim 1 wherein the portion of the boundary of the first polygon that is located inside the second polygon is determined by determining on which side of the boundary of the second polygon the portion of the boundary of the first polygon is located.

11. The method of claim 1 wherein the intersection of the boundary of the first polygon with the boundary of the second polygon is found by searching a rectangular area formed by an intersection of a first minimum bounding rectangle encompassing the first polygon and a second minimum bounding rectangle encompassing the second polygon.

12. The method of claim 1 further comprising:

determining an additional polygonal intersection of the first polygon and the second polygon by performing the determining steps for any additional intersection of the boundary of the first polygon with the boundary of the second polygon which is not already part of the polygonal intersection of a first polygon and a second polygon already determined.

13. The method of claim 1 wherein the steps of determining are performed on a server connected to the Internet and that provides navigation-related services to users.

14. A program on a computer readable medium for determining a polygonal intersection of a first polygon and a second polygon, wherein the first polygon has a boundary comprised of a series of links ordered in a known rotational direction and the second polygon has a boundary comprised of a series of links ordered in the known rotational direction, the program comprising:

program code that determines a first known portion of a boundary of the polygonal intersection as comprised of a portion of the boundary of the first polygon that is located inside the second polygon, wherein the portion of the boundary of the first polygon that is located inside the second polygon is comprised of one or more links at an intersection of the boundary of the first polygon with the boundary of the second polygon; and program code that determines a subsequent portion of the boundary of the polygonal intersection where a leading end of the current known portion of the boundary of the polygonal intersection connects to two other links by selecting that portion of the boundary of either the first polygon or the second polygon that connects to the leading end of the current known portion of the boundary of the polygonal intersection that forms a minimum rotation angle in the rotational direction with the current known portion of the boundary of the polygonal intersection if the direction of traversal of the current known portion of the boundary of the polygonal intersection is opposite the known rotational direction or that forms a minimum rotation angle in the opposite rotational direction with the current known portion of the boundary of the polygonal intersection if the direction of traversal of the current known portion of the boundary of the polygonal intersection is the same as the known rotational direction.

15. The invention of claim 14 wherein said program is run on a server connected to the Internet that provides navigation-related services to users.

16. The invention of claim 14 wherein said polygons represent two dimensional geographic features.

17. The invention of claim 14 wherein said polygons are represented by data contained in a database that represents geographic features.

18. A method for determining a polygonal intersection of a first polygon and a second polygon represented by data contained in a geographic database, wherein a boundary of the first polygon is represented by a first list of links connected at endpoints thereof and the second polygon is represented by a second list of links connected at endpoints thereof, wherein an endpoint of a link is represented by either a node or a shape point;

wherein each location at which the boundary of the first polygon intersects with the boundary of the second polygon is represented by a node;

wherein the links contained in the first list of links are in an order corresponding to a consistent direction of traversal of the corresponding links representing the boundary of the first polygon;

wherein the links contained in the second list of links are in the order corresponding to the consistent direction of traversal of the corresponding links representing the boundary of the second polygon;

the method comprising the steps of:

determining a first minimum bounding rectangle that encompasses the first polygon;

determining a second minimum bounding rectangle that encompasses the second polygon;

determining that the first minimum bounding rectangle and the second minimum bounding rectangle intersect;

identifying each link located entirely in a first polygonal area formed by an intersection of the first minimum bounding rectangle and the second minimum bounding rectangle that has at least one node at an endpoint of said link;

associating in a node-link map each node connected to each identified link with each link to which the node is connected;

identifying a node from the node-link map that has at least three links connected to it;

from the order of two of said at least three links that belong to one of the polygons, determining which one of said at least three links that belong to the other of polygons as located inside the one of said polygons;

using the link that is located inside the one of said polygons as a starting link for the polygonal intersection of the first polygon and the second polygon; and determining each other link of the polygonal intersection by selecting a link that connects to a currently known link in a selected direction of traversal and where a leading end of a currently known portion of the polygonal intersection in the selected direction of traversal connects to two other links, selecting that link that forms a minimum rotation angle in a selected rotational direction with the currently known link, wherein the selected rotational direction is opposite to the selected direction of traversal.

19. The method of claim 18 wherein the steps of determining, associating, identifying and using are performed by a software program that uses the geographic database.

20. The method of claim 18 wherein the steps of determining, associating, identifying and using are performed on a server connected to the Internet and that provides navigation-related services to users.

* * * * *